3,061,459
METHOD OF LACQUERING METAL SURFACE EMPLOYING A PRIMING COATING OF A REACTION LACQUER COMPRISING AN ACRYLATE MONOMER, AN UNSATURATED POLYESTER, AND POLYVINYL METHYL ETHER

Erich Bäder, Hanau (Main), Germany, assignor to Deutsche Gold- und Silber-Scheideanstalt vormals Roessler, Frankfurt am Main, Germany
No Drawing. Filed Nov. 13, 1959, Ser. No. 852,597
Claims priority, application Germany Nov. 18, 1958
1 Claim. (Cl. 117—75)

The present invention relates to an improved method of lacquering metal surfaces employing a priming coating of a reaction lacquer comprising an acrylate monomer, an unsaturated polyester and polyvinyl methyl ether.

A simplified flow diagram of the method is as follows:

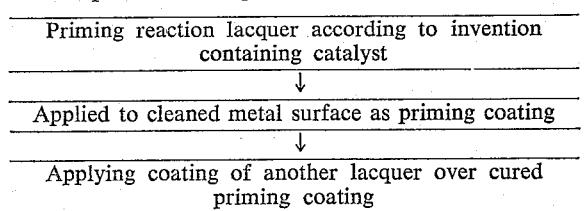

Lacquers for wood are already known which are mixtures of unsaturated polyester resins and styrene. Such lacquers possess a number of advantages over the nitro-lacquers which previously primarily had been used. Their high gloss and great hardness are of special advantage. In addition, lacquers of this type can be applied in thicker layers in one working operation.

Such reaction lacquers, however, have not lent themselves for lacquering metals as their bond to metals is too weak.

Furthermore, mixtures which essentially consist of monomeric and polymeric methyl methacrylate are also known as metal lacquers. While such lacquers also possess great hardness and high gloss, their bond to metals still is rather unsatisfactory.

In addition, U.S. Patent No. 2,894,932 has disclosed adhesive compositions which essentially consist of mixtures of unsaturated polyester resins, polymerizable acrylic or methacrylic acid esters, polyvinyl ethers compatible with the polyester, particularly polyvinyl methyl ether, and hardening catalysts. Per compounds, preferably in combination with tertiary amines or aminosulfones, were employed as catalysts for such adhesive compositions. If desired, other catalytically active substances such as compounds containing a labile halogen atom or catalytic heavy metal compounds could also be employed as cocatalysts.

According to the invention it was found that mixtures of the latter type, that is, mixtures having at least one lower aliphatic ester of acrylic, methacrylic or ethacrylic acid, preferably methyl methacrylate, at least one unsaturated polyester resin, at least one polyvinyl ether compatible with the polyester resin, preferably polyvinyl methyl ether, and a hardening catalyst as their essential ingredients, could be admirably adapted as reaction lacquers for lacquering metals. Such lacquers upon hardening are firmly bonded to the metal surfaces to which they were applied and do not spall off even upon sharp bending of the metal surfaces.

The individual components of the lacquers according to the invention are employed in such proportions that the resulting mixtures have a consistency adapted for their application as lacquers. In general, it is advisable that the liquid portion of such reaction lacquer mixtures is at least 40%. In some instances, it can be advantageous to raise the quantity of the liquid portion to 90%. The selection of the proportion of the liquid portion depends upon the quantities of solid substances which are difficult to apply and the quantities of stringy substances present in the composition. Often it is expedient to alter the consistency of the mixtures by the addition of non-polymerizable solvents, such as ethyl acetate, butyl acetate, toluene, acetone and the like. In general, such addition should not be over 10–15%. The painting, dipping or spraying viscosity of the reaction lacquers according to the invention can therefore be adjusted to the special requirements of the application at hand.

Preferably, the unsaturated polyester resin component is one containing a relatively large number of double bonds and essentially composed of short chained aliphatic polyhydric alcohols, such as glycol, 1,3-propyl glycol and the like, and short chained unsaturated polybasic acids, such as fumaric acid, maleic acid and the like. In addition, such resins may contain certain quantities of higher glycols, such as hexane diols and the like, as well as higher dicarboxylic acids, such as adipic acid, phthalic acid and the like.

The quantity of polyvinyl ether contained in the compositions preferably is 1–35%.

The lacquer compositions can, in addition to the three essential components mentioned, also contain other monomers such as other methacrylic or acrylic acid esters, such as butyl methacrylate, and small quantities of other polymers, such as polyvinyl acetate, polyvinyl chloride, ketone aldehyde resins and the like. For some purposes it may be advantageous to add fillers, such as powdered slate, barium sulfate, finely divided silica and the like. Also, the addition of small quantities of paraffin is possible.

The processing and hardening times of the lacquers according to the invention can be varied between a few minutes and several hours by selection of suitable polymerization initiator systems. Combinations of aromatic tertiary amines and/or α-amino sulfones with organic peroxides, such as benzoyl peroxide, are well suited for effecting rapid hardening at room temperatures. Substances with labile halogen atoms and/or small quantities of heavy metal compounds can be added to such catalysts as promoters. On the other hand, the adhesives can also be hardened with the aid of peroxides alone and heating.

The reaction lacquers of the above type harden rapidly after the components have been admixed. It is therefore expedient to provide two separate mixtures for storage purposes, of which the first contains the film forming components and if desired the reducing portions and co-catalysts of the redox system, whereas the second mixture, the "hardening paste," contains the peroxidic catalysts and if desired α-amino sulfones distributed in a solvent or plasticizer. Both mixtures are intimately mixed shortly before or during the lacquering and the intimate mixture applied to the metal to be lacquered as a uniform coating.

The reaction lacquers according to the invention can be applied with the aid of brushes, spray pistols, such as previously have been employed for the previously known polyester lacquers, or by dipping. The lacquers according to the invention have a high gloss and furthermore firmly bond themselves to the metal surface to which they are applied. They will not spall off even if the metal is given a sharp bend.

It was furthermore found that the surface hardness and the water resistance of the lacquers could be improved by the addition of at least one further vinyl compound, such as styrene, vinyl toluene, vinyl acetate and the like. Expediently these substances are added in only small quantities, preferably, up to 15% by weight of the total mixture.

In addition, monomers having a cross-linking action, such as glycol dimethacrylate, allyl methacrylate, diallyl phthalate, triallyl cyanurate and the like, can also be added with advantage to the lacquer compositions.

By varying the proportions of all of the components of the lacquer compositions it is possible to provide reaction lacquers specially adapted for the intended use.

While the lacquers according to the invention have general utility for coating metals, it was found that they are particularly adapted as primers for other lacquers, particularly the other known reaction lacquers, such as those based on polyester resins and styrene. It is possible in this way to combine the properties provided by known lacquers with those of the lacquers according to the invention. The priming coatings according to the invention may also contain certain quantities of various types of pigments. The priming coatings obtained have especially high adherence on the metal to which they are applied and furthermore have a smooth surface which if desired can be further improved by wet grinding. Other lacquer coatings can be applied over the priming coating without difficulty. It is not necessary that the priming coating be fully hardened before the other lacquers are applied thereover. It is even advantageous to apply the second coating while the initial priming coating is still wet.

In general, it is not necessary to pretreat the metal surfaces to be lacquered, but it is expedient, as customary, to clean the surfaces thoroughly to remove all fat, oil and dirt.

The following examples illustrate the invention. In such examples the "parts" are parts by weight unless otherwise specified. In all cases the coating has a thickness of 300μ provided that no other values are given.

The so-called "Erichsen test" which was used in these examples means that the metal sheets, to which the reaction lacquers had been applied, are pressed by a metal ball with a speed of 1 mm. in 20 sec. until the coating breaks. The depth of the penetration is measured.

The so-called "Latticecut test" (L.C. test), which has also been used in these examples and which has been carried out by means of the Peter's apparatus, means that the metal sheets, the reaction lacquers have been applied to, are scratched cross-wise by several knives which are parallelly arranged to each other at a distance of 1 mm. The coatings are scratched so severely that the knives reach the surface of the metal. The results are called very good when the edges of the resulting squares of the coating do not bend up.

*Example 1*

Sheet iron (1.3 mm. thick) was pickled at room temperature with a 20% HCl which contained Corresin and then coated with a reaction lacquer which consisted of 64.7 parts of methyl methacrylate, 7 parts of unsaturated polyester resin (Palatal K 211/6 which is a commercial product of BASF, Germany), 27.0 parts of polyvinyl methyl ether, 1.0 part of di-iso-propylol-p-toluidine, 0.3 part of paraffin, 3.0 parts of a hardening paste which consisted of 50% of benzoyl peroxide and 50% of dibutyl phthalate. The coating was dry within 20 minutes at room temperature. The Erichsen test showed, after the sheets had been stored for 6 days at room temperature, a depth of penetration of 12 mm. At this point the metal ruptured. The same result was obtained when the sheets had been stored additionally for 1 hour at 100° C. The L.C. test, which was made after a storage of 6 days at room temperature, respectively 6 days at room temperature and additionally 1 hour at 100° C., was very good.

*Example 2*

Example 1 was repeated with the exception that a reaction lacquer composition was used which additionally contained 30 parts of barium sulfate and 1 part of iron oxide per 100 parts of the composition of Example 1. The depths of penetration under the conditions of Example 1 were in both cases 8 mm. and the L.C. test also showed very good results.

*Example 3*

Example 1 was repeated with the exception that a lacquer composition was used which consisted of:

| | Parts |
|---|---|
| Methyl methacrylate | 49.2 |
| Vinyl toluene | 10.0 |
| Unsaturated polyester resin (as in Example 1) | 15.0 |
| Polyvinyl methyl ether | 25.0 |
| Diisopropylol-p-toluidine | 0.5 |
| Paraffin | 0.3 |
| Hardening paste | 3.0 |

The Erichsen test, which was made under the same conditions shown in Example 1, produced a penetration depth of 8 mm. in both cases. The L.C. test was also very good, that means that the edges of the resulting squares did not bend up.

*Example 4*

The lacquer composition of Example 1 was applied to an aluminum sheet which had been pickled for 60 minutes with a composition consisting of 22.5% concentrated sulfuric acid, 7.5% sodium dichromate and 70% water. The lacquer was dry after 20 min. at room temperature. The L.C. test showed very good results. None of the resulting squares showed a loss of adhesion.

*Example 5*

The same results as in Example 4 were obtained when instead of aluminum, a copper sheet, or respectively a brass sheet was used. The surfaces of these sheets had been roughened mechanically.

*Example 6*

Sheet iron was coated with a polymerization composition known in the art which consisted of

| | Parts |
|---|---|
| Unsaturated polyester resin, consisting of 2 parts of the polyester of maleic acid, phthalic acid and 1.3 propylene glycol in the proportion 2:1:3,1 and 1 part of monostyrene | 48 |
| Monomeric styrene | 52 |
| Paraffin | 0.05 |
| Diisopropylol-p-toluidine | 0.5 |
| Hardening paste (50% of benzoyl peroxide and 50% of dibutylphthalate) | 4.0 |

The coating had a thickness of 100 to 200μ. After 1 hour at room temperature and 1 hour at 100° C., this coating showed a bad L.C. test. When a priming coat corresponding to the mixtures of Examples 1 or 2 (thickness of 100 to 200μ) had been first, it showed a very good L.C. test.

*Example 7*

For comparison, Example 1 was repeated with a mixture known in the art of Example 6. The coating was dry after 15 min. The penetration of the Erichsen test was 1.5 mm. after a storage of 6 days at room temperature. After a storage of 6 days at room temperature and additionally 1 hour at 100° C., the penetration depth was only 0.6 mm. After the two storages the L.C. test showed also bad results.

Example 8

For comparison, Example 1 was repeated with a polymerization mixture known in the art, which consisted of

| | Parts |
|---|---|
| Unsaturated polyester resin as in Example 6 | 48 |
| Monomeric styrene | 52 |
| Paraffin | 0.05 |
| Accelerator liquid consisting of 1% cobalt octoate, dissolved in styrene | 0.4 |
| Hardening paste consisting of 50% of cyclohexanone peroxide in dibutyl phthalate | 4 |

The coating was dry within 45 min. at room temperature. The penetration depth according to the Erichsen test was 2 mm. after a storage of 6 days at room temperature and 0.6 mm. when the metal sheets had been additionally stored for 1 hour at 100° C. The L.C. test also was bad. The above-mentioned polymerization mixture is also known as an adhesive composition for bonding metals. When sheet iron (10 cm. long, 2 cm. broad and 2 mm. thick) is bonded with this adhesive with an overlap of 1 cm., a shearing strength of 130 kg./cm.$^2$ can be reached. This shows that a polymerization mixture which is suitable as an adhesive does in all instances meet the requirements which are expected from reaction lacquers.

Example 9

Example 2 was repeated but instead of 64.7 parts of methyl methacrylate, 5 parts of butylacrylate and 60 parts of methyl methacrylate were used. The results were essentially the same as in Example 2 with the exception that the Erichsen test showed a difference of about 1 mm.

Example 10

Example 1 was repeated but instead of 64.7 parts of methyl methacrylate, 5 parts of butyl methacrylate and 60 parts of methyl methacrylate were used. The results were essentially the same as in Example 2 only with the exceptance that the Erichsen test showed a difference of about 1 mm.

The reaction lacquers which are within the scope of this invention may contain 3 to 25 parts by weight of the unsaturated polyester resins, 1 to 35 parts by weight of the polyvinylethers and 40 to 90 parts by weight of the lower aliphatic esters of acrylic, methacrylic or ethacrylic acid. Reaction lacquers which show by far the best results contain of 5 to 15 parts by weight of unsaturated polyester resins, 15 to 30 parts by weight of polyvinyl ethers, 50 to 90 parts by weight of the lower aliphatic esters of acrylic, methacrylic or ethacrylic acid. The unsaturated polyester resins which are used according to this invention are known per se and are described for instance in the U.S. Patent No. 2,255,313 and J. A. Ch. S. 52 (1930), 3636.

Also the catalytical systems which have been used in the examples, are known per se, f.i. they are described in the French Patent No. 1,179,685 and in the U.S. Patents Nos. 2,758,106, 2,779,751, 2,776,952 and 2,768,156.

Although it is useful to subject the metal sheets to a pickling or blanching process as described above before coating, in many cases a simple purification may be sufficient.

I claim:

A method of lacquering metal surfaces which comprises applying to such surfaces a uniform priming coating of a reaction lacquer containing as its essential ingredients a mixture of at least one lower aliphatic ester of an acrylic acid selected from the group consisting of acrylic, methacrylic and ethacrylic acids, at least one unsaturated polyester resin obtained by the esterification of a short chained polyhydric alcohol with a short chained ethylenically unsaturated polycarboxylic acid and at least one polyvinyl ether compatible with the polyester resin and also containing a hardening catalyst the proportions in parts by weight of the acrylic acid ester to unsaturated polyester resin to polyvinyl ether being 40–90:3–25:1–35 and applying another lacquer over said priming coating.

References Cited in the file of this patent

UNITED STATES PATENTS

| | | |
|---|---|---|
| 2,353,910 | Lawler et al. | July 18, 1944 |
| 2,844,559 | Parker | July 22, 1958 |
| 2,876,135 | Levine | Mar. 3, 1959 |
| 2,894,932 | Bader et al. | July 14, 1959 |
| 2,955,958 | Brown | Oct. 11, 1960 |